(12) United States Patent
Soga

(10) Patent No.: US 7,269,134 B2
(45) Date of Patent: Sep. 11, 2007

(54) DEVICE FOR DESIGNING STANDBY PATH, METHOD FOR DESIGNING STANDBY PATH, AND PROGRAM THEREFOR

(75) Inventor: Kenji Soga, Tokyo (JP)

(73) Assignee: NEC Corporation, Tokyo (JP)

( * ) Notice: Subject to any disclaimer, the term of this patent is extended or adjusted under 35 U.S.C. 154(b) by 1015 days.

(21) Appl. No.: 10/309,130

(22) Filed: Dec. 4, 2002

(65) Prior Publication Data

US 2003/0103467 A1    Jun. 5, 2003

(30) Foreign Application Priority Data

Dec. 5, 2001   (JP) .............................. 2001-370798

(51) Int. Cl.
*G06F 11/00*   (2006.01)
(52) U.S. Cl. ...................... 370/225; 370/221; 379/273; 709/239
(58) Field of Classification Search ................ 379/273; 709/239
See application file for complete search history.

(56) References Cited

U.S. PATENT DOCUMENTS

| | | | | |
|---|---|---|---|---|
| 6,744,727 B2 * | 6/2004 | Liu et al. | ..................... | 370/228 |
| 6,904,462 B1 * | 6/2005 | Sinha | ......................... | 709/226 |
| 6,914,877 B1 * | 7/2005 | Alamineh | .................. | 370/217 |
| 6,934,248 B1 * | 8/2005 | DeBoer et al. | ............. | 370/217 |
| 7,051,113 B1 * | 5/2006 | Katukam et al. | ........... | 709/239 |
| 2002/0172149 A1 * | 11/2002 | Kinoshita et al. | ........... | 370/216 |

FOREIGN PATENT DOCUMENTS

| JP | 07-250356 | 9/1995 |
|---|---|---|
| JP | 11-191763 | 7/1999 |

OTHER PUBLICATIONS

2001 Electronics Information Communication Association General Conference B-6-21.

* cited by examiner

*Primary Examiner*—Seema S. Rao
*Assistant Examiner*—Kevin Mew
(74) *Attorney, Agent, or Firm*—Young & Thompson

(57) ABSTRACT

A device for designing a standby path that can prevent retrieval of a standby path in a network including any standby path from being failed. A current path search unit searches for a shortest route from a start point to an end point in the network. A standby path searching network creation unit creates a standby path searching network. For a standby path, a standby path search unit searches for a shortest route from the start point to each of all other nodes including the end point. A current path searching network creation unit creates a network from the current path retrieved by the current path search unit and the path retrieved by the standby path search unit. The process performed by these units is repeated until the standby path search unit retrieves a route that reaches from the start point to the end point in the shortest route search.

4 Claims, 16 Drawing Sheets

PRIOR ART

DEVICE FOR DESIGNING STANDBY PATH, METHOD FOR DESIGNING STANDBY PATH, AND PROGRAM THEREFOR

BACKGROUND OF THE INVENTION

1. Field of the Invention

The present invention relates to a device for designing a standby path, a method for designing a standby path and a program therefor. In particular, it relates to designing a standby path used in on-fault switching, in which switching from a current path to a standby path is conducted when a fault occurs on a network.

2. Description of the Prior Art

For on-fault switching, in which switching from a current path to a standby path is conducted when a fault occurs on a network, the standby path may be designed to bypass the point of the fault when the fault occurs or may be designed in advance of occurrence of the fault.

In the latter case, in order to cope with a fault occurring at any point in the current path, the standby path needs to be designed not to pass through any node or link involved in the current path.

An example of such a conventional method of designing a standby path is described in Japanese Patent Laid-Open No. 7-250356. In this example, a current path is first searched for according to shortest route search. Then, shortest route search is performed for a standby path with lengths of optical transmission paths connected to the nodes that the current path has passed through being set to an adequately high value, so that the optical transmission paths involved in the current path are not chosen in shortest route search for the standby path.

In this way, the standby path is designed which does not involve any optical transmission paths involved in the current path. FIG. 16 shows a configuration of a conventional device for designing a standby path according to this example. In a device 2 for designing a standby path shown in FIG. 16, a current path search unit 21 first searches for a current path, and then, a standby path searching network creation unit 22 imparts an adequately long length to each of the optical transmission paths connected to the nodes that the current path passes through. Then, a standby path search unit 23 searches for a standby path according to shortest route search.

If the standby path is searched for after the current path is determined as described above, no standby path may sometimes be retrieved depending on a manner of setting up the current path. An example of such a case will be described with reference to FIGS. 4 and 5. In FIG. 4, reference symbols A, B, C, D, E and Z each denote nodes, and numeric characters appended to links connecting nodes together each denote lengths of the respective links. It is assumed that a current path and a standby path both extending from a start point (node A) to an end point (node Z) are to be designed. In FIG. 4, if the shortest path from the start point (node A) to the end point (node Z) is adopted as the current path, a current path (A-B-C-Z) results.

In order to retrieve a standby path that does not involve any link involved in the current path (A-B-C-Z), a path extending from the start point (node A) to the end point (node Z) is searched for in a network with a link between the nodes A and B (bidirectional), a link between the nodes B and C (bidirectional) and a link between the nodes C and Z (bidirectional) being excluded. However, as shown in FIG. 5, the network includes no route that reaches from the start point (node A) to the end point (node Z), and therefore, retrieval of a standby path results in failure.

SUMMARY OF THE INVENTION

An object of the present invention is to provide a device for designing a standby path that can prevent retrieval of a standby path in a network including any standby path from being failed, a method for designing a standby path used for the device, and a program therefor.

A device for designing a standby path according to this invention comprises: current path search means for searching a network for a current path; standby path searching network creation means for creating a standby path searching network based on a result obtained by the current path search means; standby path search means for searching for a standby path in the network created by the standby path searching network creation means; and current path searching network creation means for transforming the network if the standby path search means has found no standby path, in which the result of the network transformation by the current path searching network creation means is passed to the current path search means, whereby the process performed by the current path search means, the standby path searching network creation means, the standby path search means and the current path searching network creation means is adapted to be repeated.

A method for designing a standby path according to this invention comprises: a first step of searching a network for a current path; a second step of creating a standby path searching network based on a result of the search; a third step of searching for a standby path in the created network; and a fourth step of transforming the network if no standby path is found, in which the search process from the first step to the fourth step is repeatedly performed.

A program for the method for designing a standby path according to this invention makes a computer repeatedly execute: a processing of searching a network for a current path; a processing of creating a standby path searching network based on a result of the search; a processing of searching for a standby path in the created network; and a processing of transforming the network if no standby path is found.

In the device for designing a standby path according to this invention, a current path search unit searches a network for a current path, a standby path searching network creation unit creates a standby path searching network, and a standby path search unit searches for a standby path in the network created. If the standby path search unit has found no standby path, a current path searching network creation unit transforms the network. Then, the process returns to the current path search unit, and the search process is repeated.

In this way, since it is provided that, if a standby path that is compatible with the current path previously found is not found in the network, the network is transformed and the same process is repeated from a current path search, retrieval of a standby path in a network including a standby path is prevented from being failed.

DETAILED DESCRIPTION OF THE PREFERRED EMBODIMENTS

Figure 1:
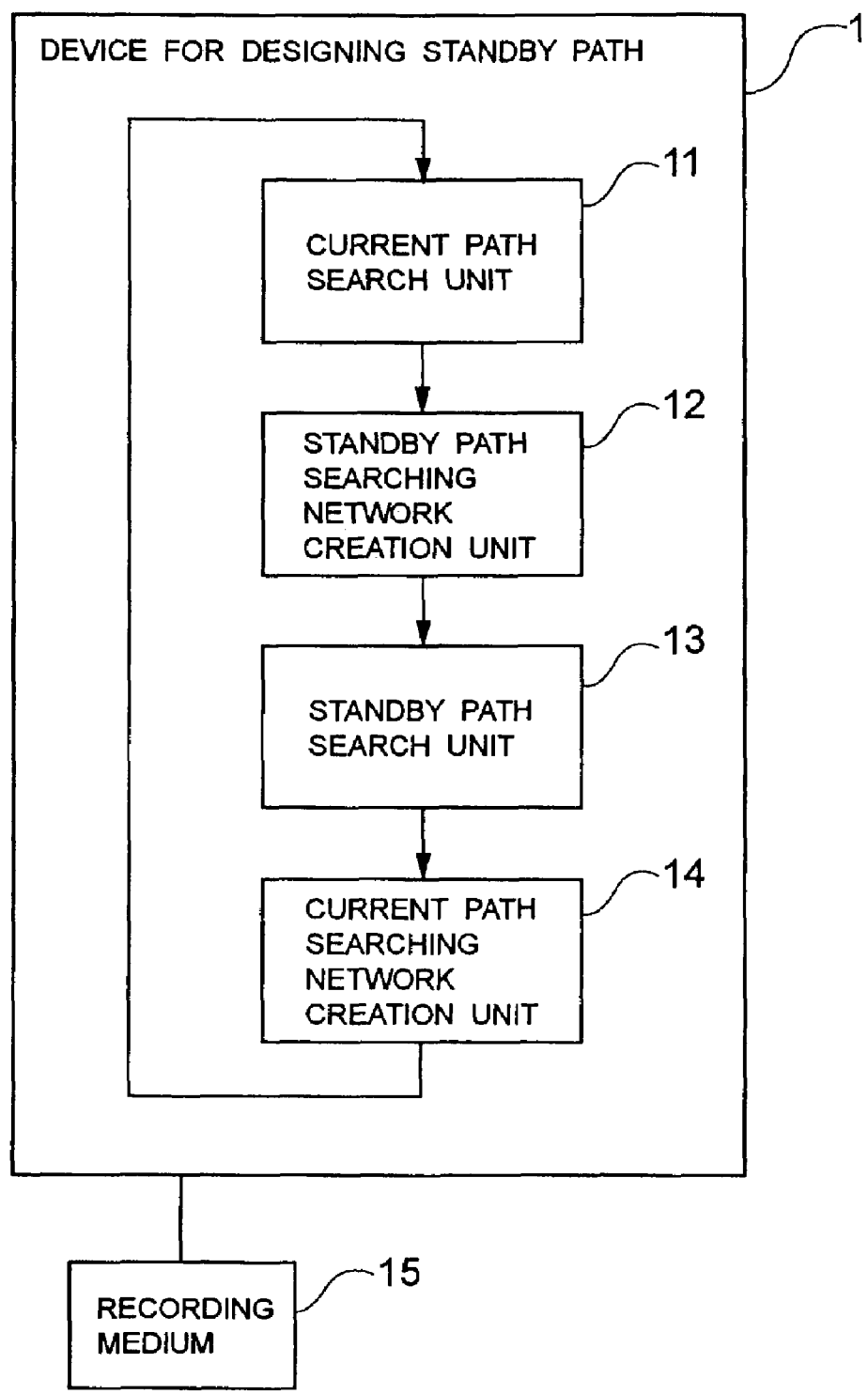
FIG. 1 is a block diagram showing a configuration of a device for designing a standby path according to a first embodiment of this invention.

Now, embodiments of the present invention will be described with reference to the drawings. FIG. 1 is a block diagram showing a configuration of a device for designing a standby path according to a first embodiment of this invention. In FIG. 1, a device 1 for designing a standby path comprises a current path search unit 11, a standby path searching network creation unit 12, a standby path search unit 13, a current path searching network creation unit 14 and a recording medium 15 for storing a program executed in the units. That is, each unit in the device 1 for designing a standby path is implemented by a computer (not shown) executing the program in the recording medium 15.

Figure 2:
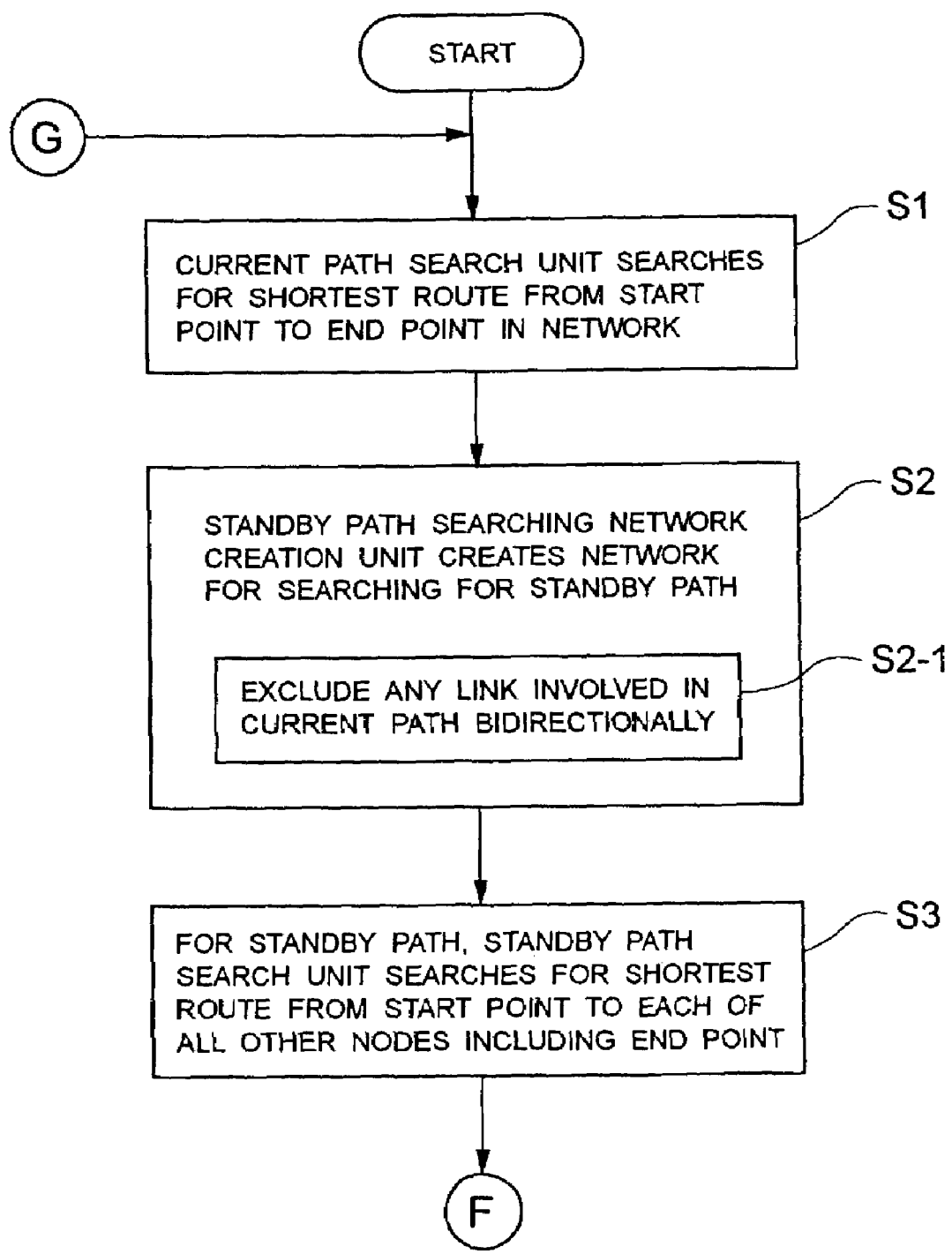
FIG. 2 is a flow chart for illustrating an operation of designing a standby path according to the first embodiment of this invention.
Figure 3:
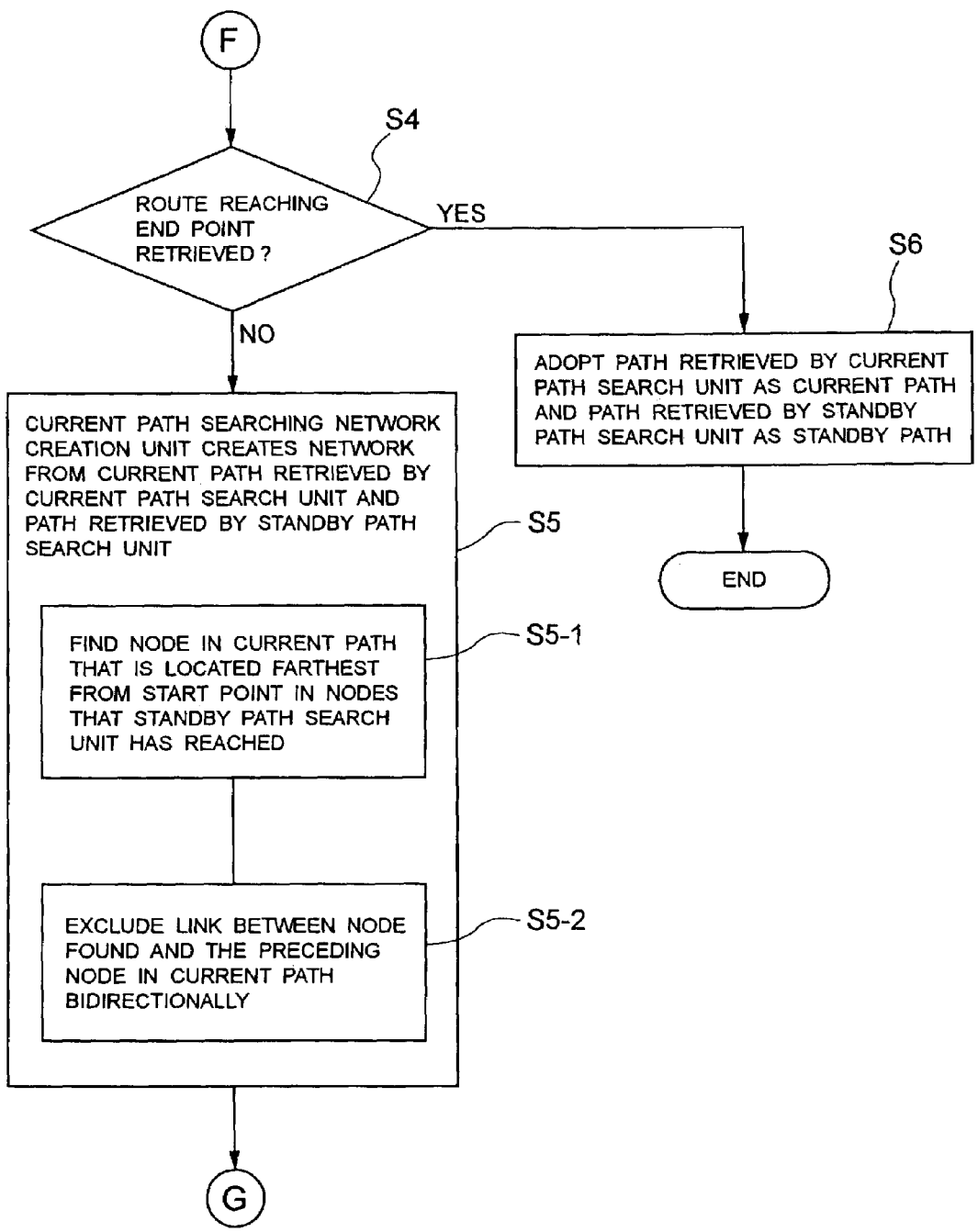
FIG. 3 is a flow chart for illustrating the operation of designing a standby path according to the first embodiment of this invention.

FIGS. 2 and 3 are flow charts for illustrating an operation of designing a standby path according to the first embodiment of this invention, and FIGS. 4 to 7 are diagrams each for illustrating an operation of designing a standby path according to the first embodiment of this invention. In FIGS. 4 to 7, reference symbols A, B, C, D, E and Z each denote nodes, and numeric characters appended to links connecting nodes together each denote lengths of the respective links. It is assumed that a current path and a standby path both extending from a start point (node A) to an end point (node Z) are to be designed.

Figure 4:
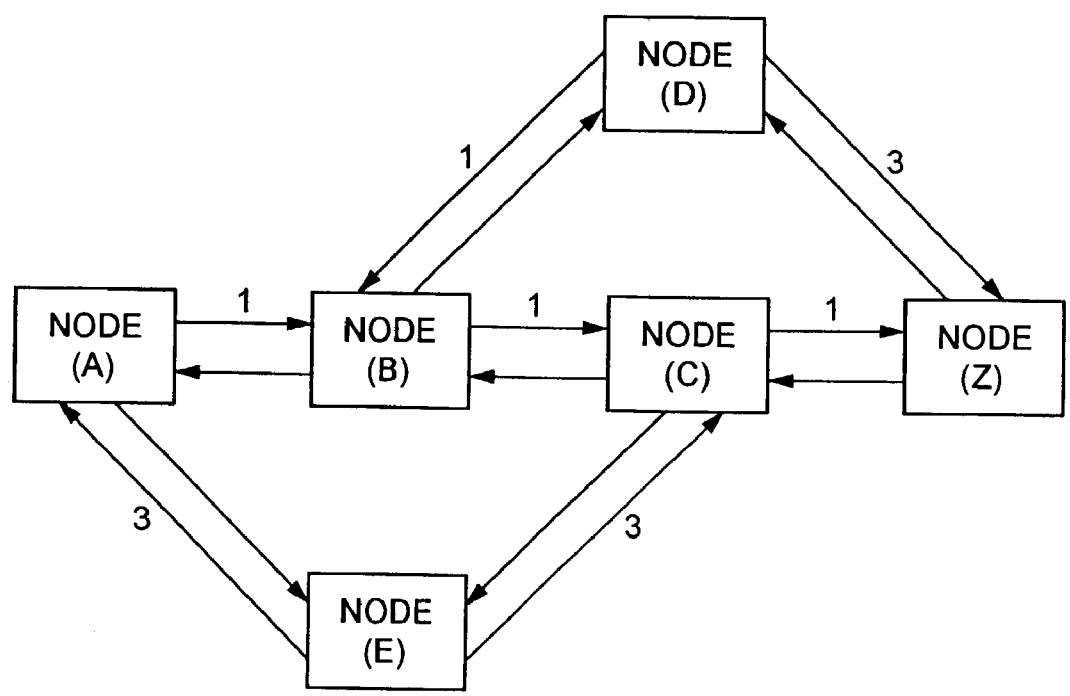
FIG. 4 is a diagram for illustrating the operation of designing a standby path according to the first embodiment of this invention.

Referring to FIGS. 1 to 7, a case where the current path and the standby path extending from the start point (node A) to the end point (node Z) in a network shown in FIG. 4 are to be designed will be described. The current path search unit 11 and the standby path search unit 13 can search for a route on the basis of any criterion, such as the shortest length and the least number of hops. In the example described below, an operation of designing the paths by searching for a shortest route will be described. A process shown in FIGS. 2 and 3 is implemented by the computer in the device 1 for designing a standby path executing the program stored in the recording medium 15.

First, for a current path, the current path search unit 11 searches for a shortest route extending from the start point (node A) to the end point (node Z) in the network shown in FIG. 4 (step S1 in FIG. 2). As a result, a current path (A-B-C-Z) is retrieved.

Then, the standby path searching network creation unit 12 creates a network for searching for a standby path (step S2 in FIG. 2). In other words, the standby path searching network creation unit 12 excludes any link involved in the current path bidirectionally (step S2-1 in FIG. 2). Since a link between the nodes A and B (bidirectional), a link between the nodes B and C (bidirectional) and a link between the nodes C and Z (bidirectional), which are involved in the current path, are excluded in the network shown in FIG. 4, the network shown in FIG. 4 is transformed into a network shown in FIG. 5.

Figure 5:
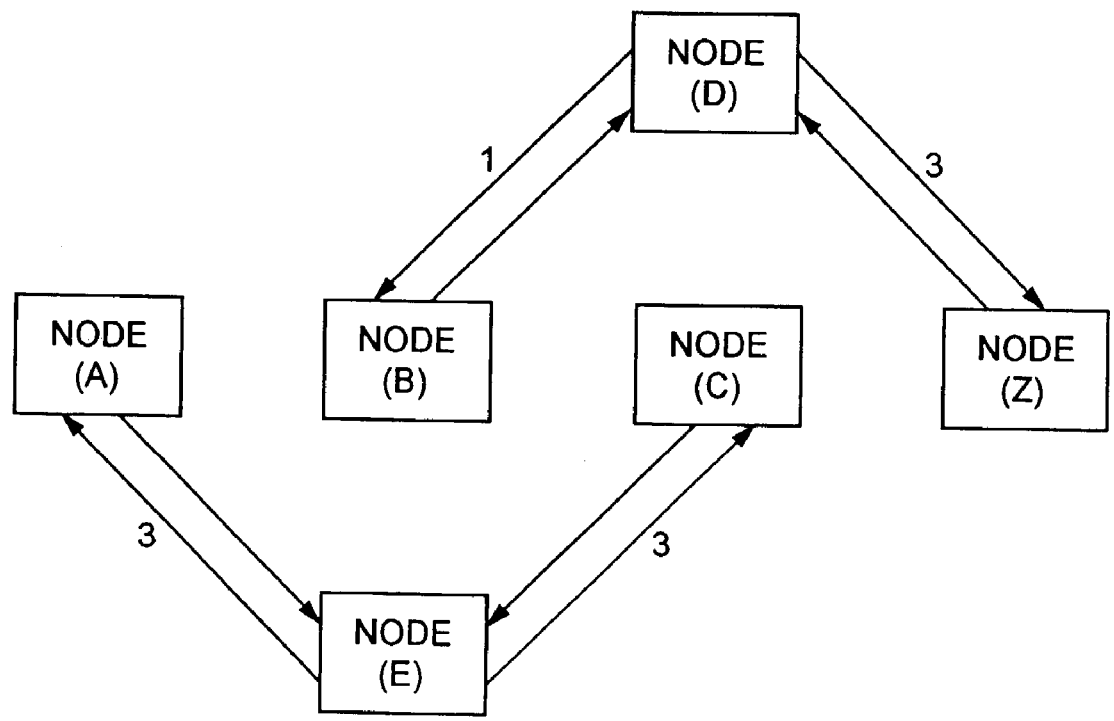
FIG. 5 is a diagram for illustrating the operation of designing a standby path according to the first embodiment of this invention.

In the network shown in FIG. 5, for a standby path, the standby path search unit 13 searches for a shortest route from the start point (node A) to each of all other nodes including the end point (node Z) (step S3 in FIG. 2). However, in the network shown in FIG. 5, the standby path search unit 13 can only reach from the start point (node A) to the nodes E and C, and cannot retrieve a route extending from the start point (node A) to the end point (node Z) (step S4 in FIG. 3). Thus, the process continues to a processing by the current path searching network creation unit 14.

The current path searching network creation unit 14 creates a network from the current path (A-B-C-Z) retrieved by the current path search unit 11 and the path (A-E-C) retrieved by the standby path search unit 13 (step S5 in FIG. 3).

Specifically, the current path searching network creation unit 14 finds a node in the current path that is located farthest from the start point (node A) in the nodes that the standby path search unit 13 has reached (step S5-1 in FIG. 3). In this example, the node C is located farthest from the start point (node A).

The current path searching network creation unit 14 excludes bidirectionally a link between the node found in step S5-1 and the preceding node in the current path (step S5-2 in FIG. 3). In other words, the current path searching network creation unit 14 excludes the link between the nodes B and C (bidirectional) in the network shown in FIG. 4 to provide a network shown in FIG. 6.

Figure 6:
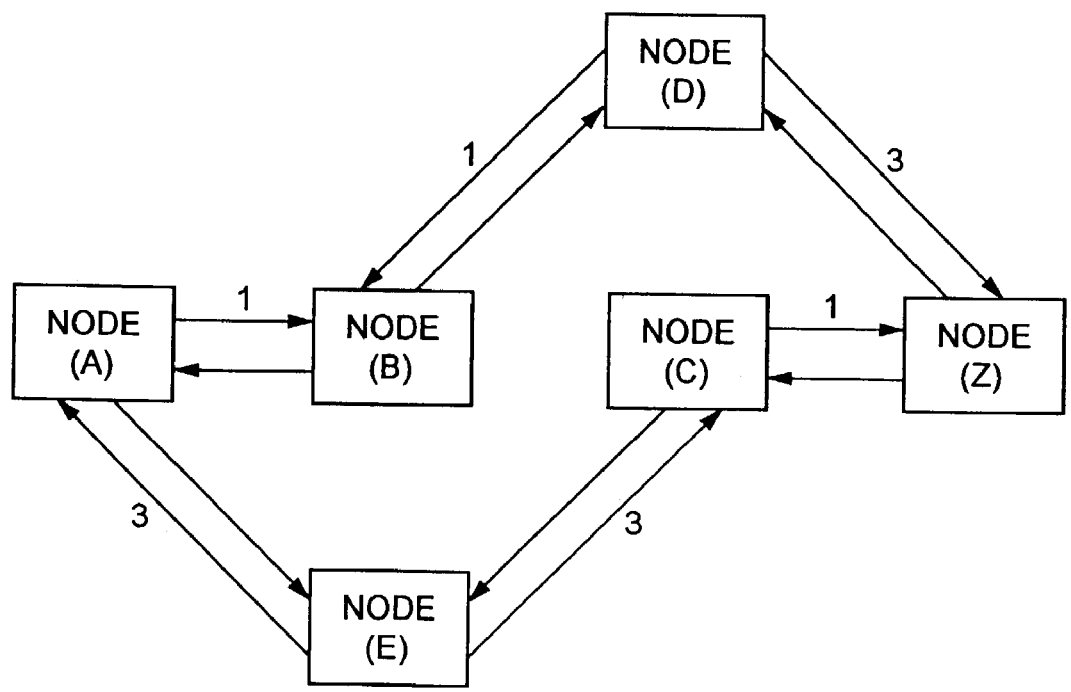
FIG. 6 is a diagram for illustrating the operation of designing a standby path according to the first embodiment of this invention.

The current path search unit 11 searches the network shown in FIG. 6 for a shortest route extending from the start point (node A) to the end point (node Z) (step S1 in FIG. 2). As a result, a current path (A-B-D-Z) is retrieved.

The standby path searching network creation unit 12 then creates a network for searching for a standby path (step S2 in FIG. 2). In other words, the standby path searching network creation unit 12 excludes any link involved in the current path bidirectionally (step S2-1 in FIG. 2). Since a link between the nodes A and B (bidirectional), a link between the nodes B and D (bidirectional) and a link between the nodes D and Z (bidirectional), which are involved in the current path, are excluded in the network shown in FIG. 6, a network shown in FIG. 7 results.

Figure 7:
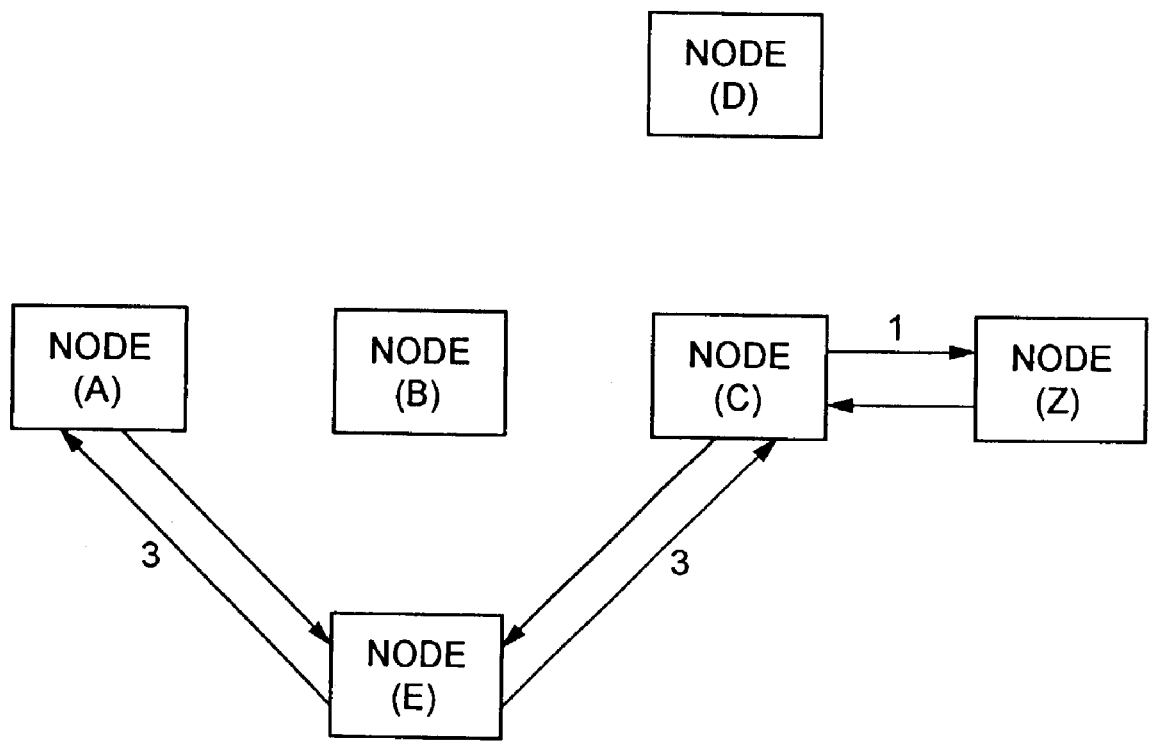
FIG. 7 is a diagram for illustrating the operation of designing a standby path according to the first embodiment of this invention.

In the network shown in FIG. 7, the standby path search unit 13 searches for a shortest route from the start point (node A) to each of all other nodes including the end point (node Z) (step S3 in FIG. 2). As a result, the standby path search unit 13 reaches from the start point (node A) to the end point (node Z) (step S4 in FIG. 3), and the shortest path from the start point (node A) to the end point (node Z) is a path (A-E-C-Z). Thus, the current path (A-B-D-Z) and the standby path (A-E-C-Z) are set up (step S6 in FIG. 3), and retrieval of a standby path is completed. In this way, the standby path not involving any link involved in the current path can be designed.

As described above, even if no standby path is found when searching for a standby path after a current path is selected, any link that has caused the failure in designing the standby path can be excluded to design another current path. Therefore, a standby path can be designed in a network including a standby path.

Now, a second embodiment of this invention will be described with reference to the drawings. In the first embodiment, a method for designing a standby path that does not pass through any link involved in a current path has been described. However, in the second embodiment, a method for designing a standby path that does not pass through any link and node involved in a current path will be described. The first and second embodiments of this invention differ from each other only in the operation of the standby path searching network creation unit 12, and the device for designing a standby path according to the second embodiment is configured the same as that shown in FIG. 1.

Figure 8:
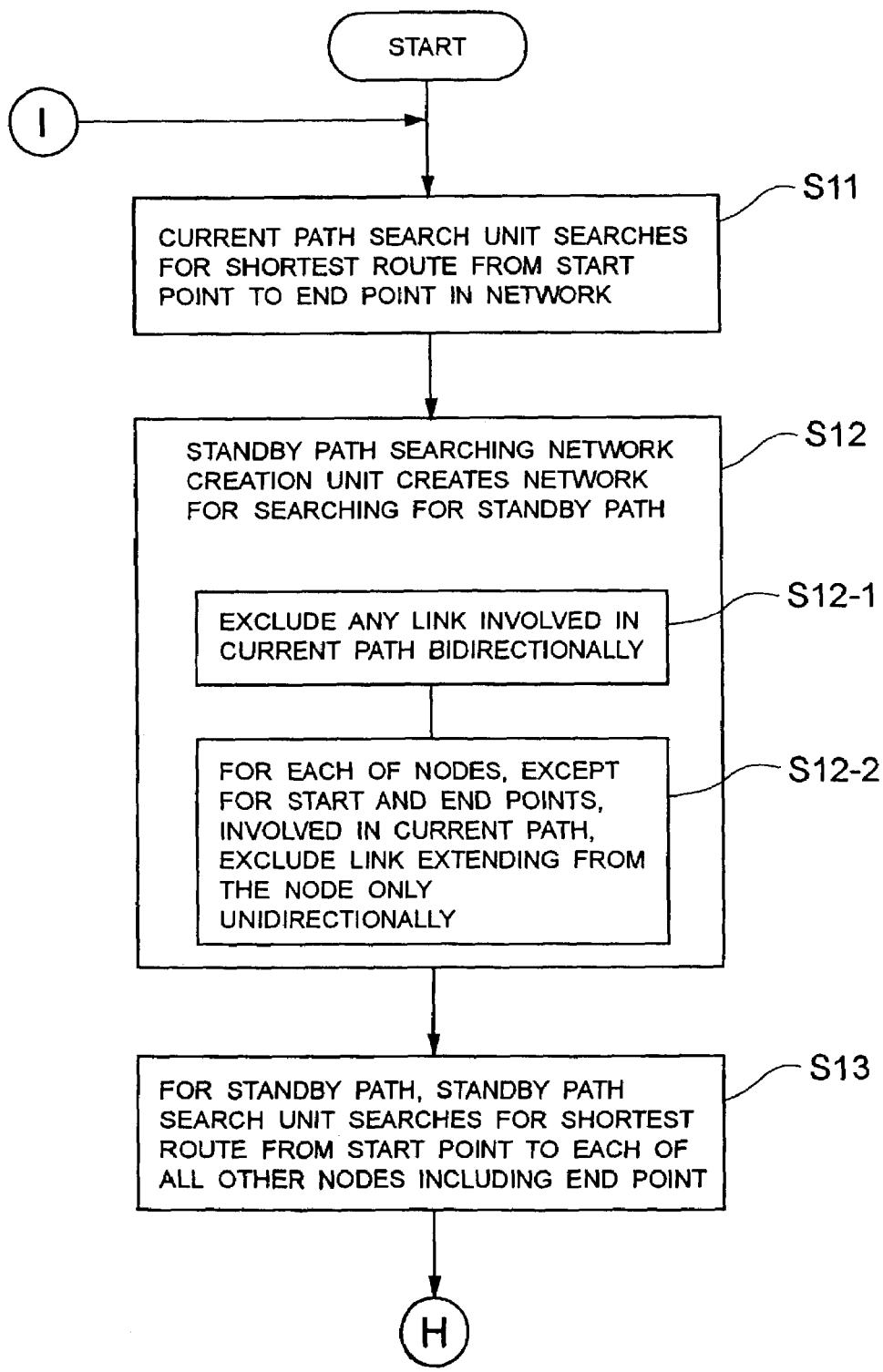
FIG. 8 is a flow chart for illustrating an operation of designing a standby path according to a second embodiment of this invention.
Figure 9:
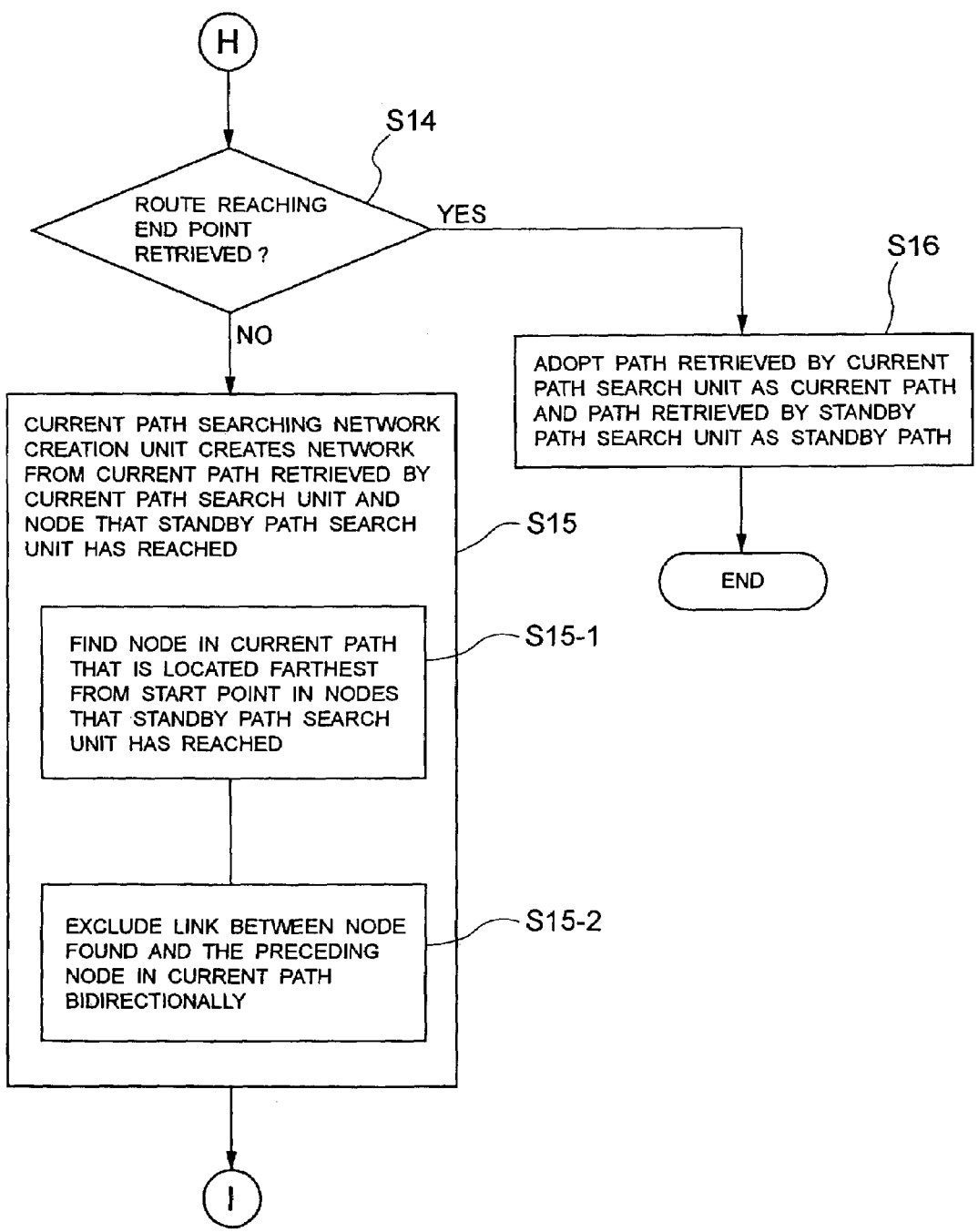
FIG. 9 is a flow chart for illustrating the operation of designing a standby path according to the second embodiment of this invention.
Figure 10:
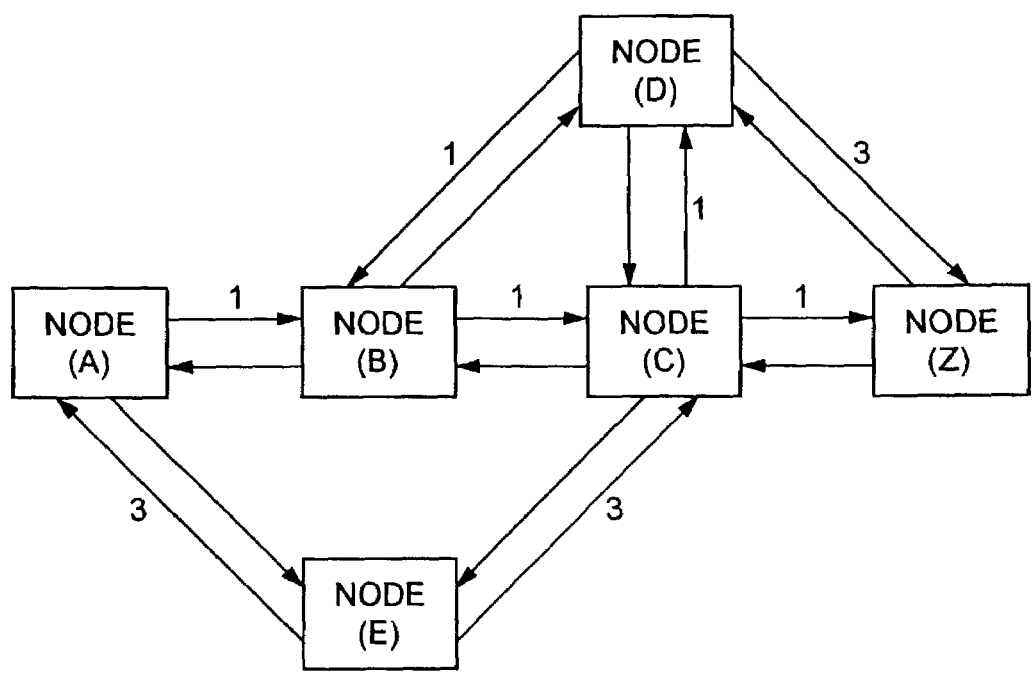
FIG. 10 is a diagram for illustrating the operation of designing a standby path according to the second embodiment of this invention.

FIGS. 8 and 9 are flow charts for illustrating an operation of designing a standby path according to the second embodiment of this invention, and FIGS. 10 to 15 are diagrams each for illustrating an operation of designing a standby path according to the second embodiment of this invention. Referring to FIG. 1 and FIGS. 8 to 15, a case where the current path and the standby path extending from the start point (node A) to the end point (node Z) in a network shown in FIG. 10 are to be designed will be described. A process shown in FIGS. 8 and 9 is implemented by the computer in the device 1 for designing a standby path executing the program stored in the recording medium 15.

First, the current path search unit 11 searches for a shortest route extending from the start point (node A) to the end point (node Z) in the network shown in FIG. 10 (step S11 in FIG. 8). As a result, a current path (A-B-C-Z) is retrieved.

Then, the standby path searching network creation unit 12 creates a network for searching for a standby path from the network shown in FIG. 10 (step S12 in FIG. 8). In other words, the standby path searching network creation unit 12 excludes any link involved in the current path bidirectionally (step S12-1 in FIG. 8). Thus, a link between the nodes A and B (bidirectional), a link between the nodes B and C (bidirectional) and a link between the nodes C and Z (bidirectional), which are involved in the current path, are excluded in the network shown in FIG. 10.

Then, for each of the nodes, except for the start and end points, involved in the current path, the standby path searching network creation unit 12 excludes a link extending from the node only unidirectionally (step S12-2 in FIG. 8). In other words, a link directed from the node B to the node D, a link directed from the node C to the node D and a link directed from the node C to the node E are excluded, and a link directed from the node D to the node B, a link directed from the node D to the node C and a link directed from the node E to the node C remain active. In this way, the network shown in FIG. 10 is transformed into a network shown in FIG. 11.

Figure 11:
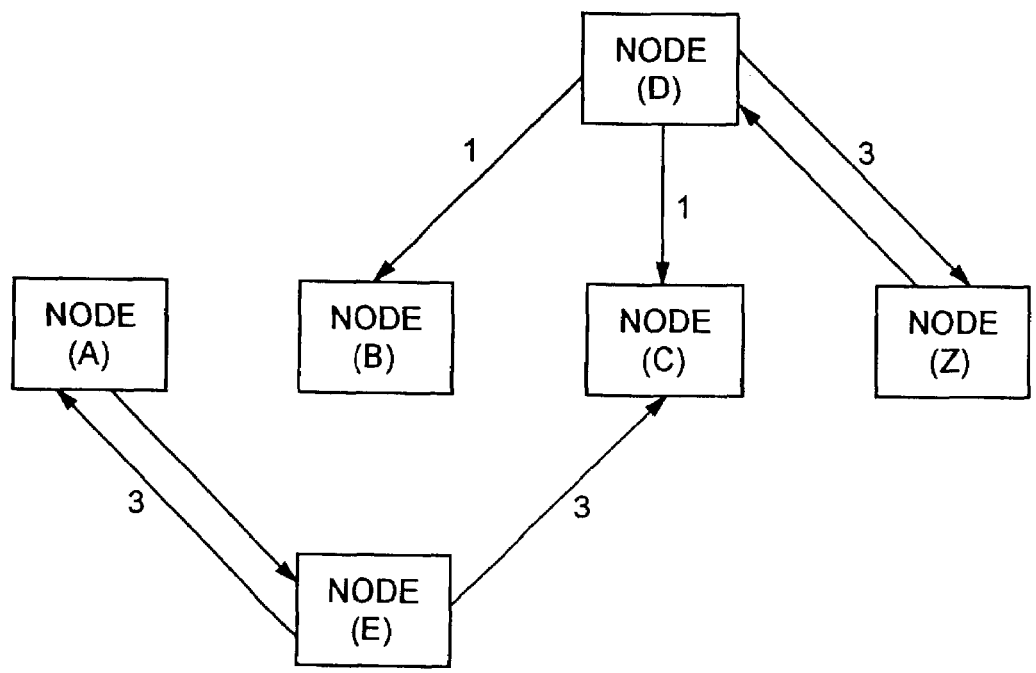
FIG. 11 is a diagram for illustrating the operation of designing a standby path according to the second embodiment of this invention.

In the network shown in FIG. 11, for a standby path, the standby path search unit 13 searches for a shortest route from the start point (node A) to each of all other nodes including the end point (node Z) (step S13 in FIG. 8). However, in the network shown in FIG. 11, the standby path search unit 13 can only reach the nodes E and C, and cannot retrieve a route extending from the start point (node A) to the end point (node Z) (step S14 in FIG. 9). Thus, the process continues to a processing by the current path searching network creation unit 14.

The current path searching network creation unit 14 creates a network from the current path (A-B-C-Z) retrieved by the current path search unit 11 and the nodes E and C which the standby path search unit 13 has reached (step S15 in FIG. 9).

Specifically, the current path searching network creation unit 14 finds a node in the current path that is located farthest from the start point (node A) in the nodes that the standby path search unit 13 has reached (step S15-1 in FIG. 9). In this example, the node C is located farthest from the start point (node A).

The current path searching network creation unit 14 excludes bidirectionally a link between the node found in step S15-1 and the preceding node in the current path (step S15-2 in FIG. 9). In other words, the current path searching network creation unit 14 excludes the link between the nodes B and C (bidirectional) in the network shown in FIG. 10 to provide a network shown in FIG. 12, which is output from the current path searching network creation unit 14.

Figure 12:
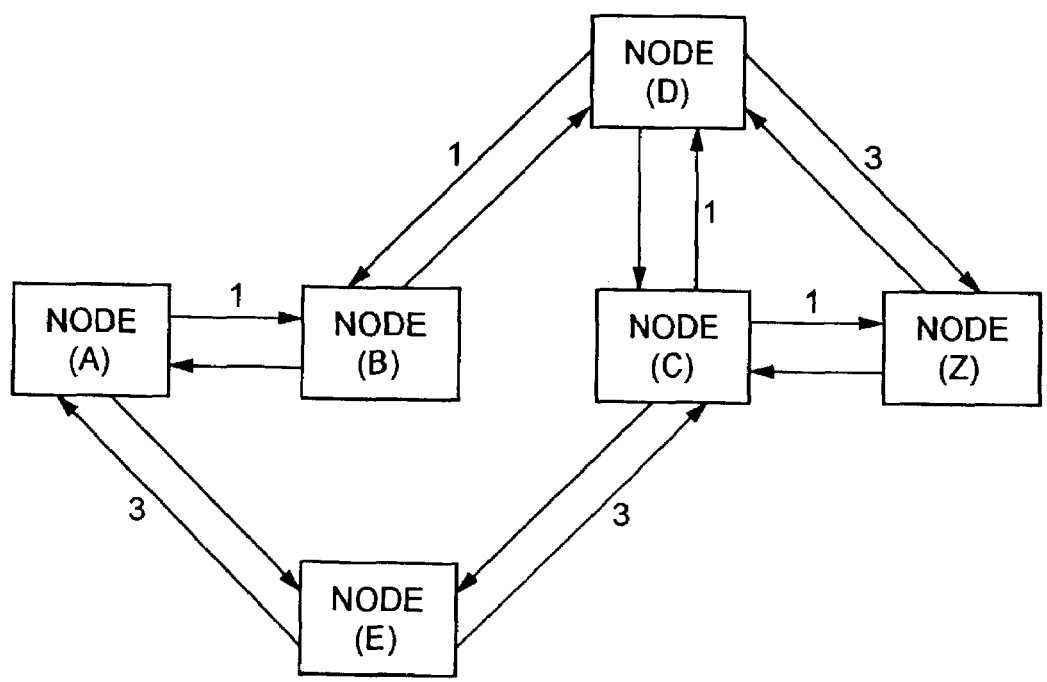
FIG. 12 is a diagram for illustrating the operation of designing a standby path according to the second embodiment of this invention.

The current path search unit 11 searches the network shown in FIG. 12 for a shortest route extending from the start point (node A) to the end point (node Z) (step S11 in FIG. 8). As a result, a current path (A-B-D-C-Z) is retrieved.

Then, the standby path searching network creation unit 12 creates a network for searching for a standby path from the network shown in FIG. 12 (step S12 in FIG. 8). In other words, the standby path searching network creation unit 12 excludes any link involved in the current path bidirectionally (step S12-1 in FIG. 8). Thus, a link between the nodes A and B (bidirectional), a link between the nodes B and D (bidirectional), a link between the nodes D and C (bidirectional) and a link between the nodes C and Z, which are involved in the current path, are excluded in the network shown in FIG. 12.

Then, for each of the nodes, except for the start and end points, involved in the current path, the standby path searching network creation unit 12 excludes a link extending from the node only unidirectionally (step S12-2 in FIG. 8). In other words, a link directed from the node C to the node E and a link directed from the node D to the node Z are excluded, and a link directed from the node E to the node C and a link directed from the node Z to the node D remain active. In this way, the network shown in FIG. 12 is transformed into a network shown in FIG. 13.

Figure 13:
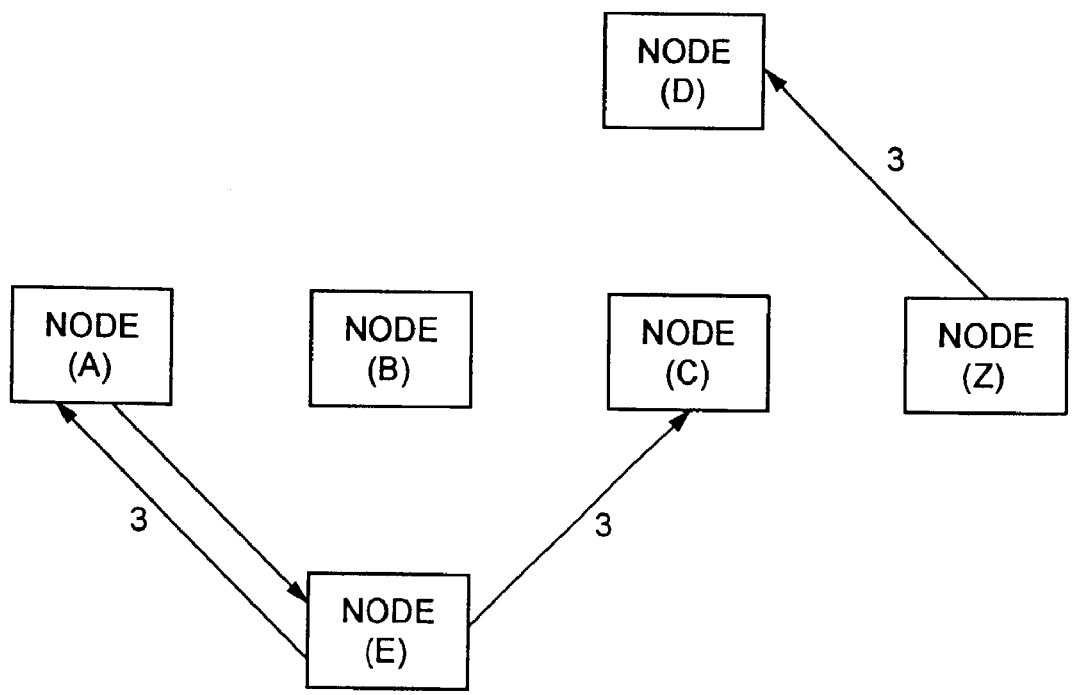
FIG. 13 is a diagram for illustrating the operation of designing a standby path according to the second embodiment of this invention.

In the network shown in FIG. 13, for a standby path, the standby path search unit 13 searches for a shortest route from the start point (node A) to each of all other nodes including the endpoint (node Z) (step S13 in FIG. 8). However, the standby path search unit 13 can only reach the nodes E and C, and cannot retrieve a route extending from the start point (node A) to the end point (node Z) (step S14 in FIG. 9). Thus, the process continues to a processing by the current path searching network creation unit 14.

The current path searching network creation unit 14 creates a network from the current path (A-B-D-C-Z) retrieved by the current path search unit 11 and the nodes E and C which the standby path search unit 13 has reached (step S15 in FIG. 9).

Specifically, the current path searching network creation unit 14 finds a node in the current path that is located farthest from the start point (node A) in the nodes that the standby path search unit 13 has reached (step S15-1 in FIG. 9). In this example, the node C is located farthest from the start point (node A).

Subsequently, the current path searching network creation unit 14 excludes bidirectionally a link between the node found in step S15-1 and the preceding node in the current path (step S15-2 in FIG. 9). In other words, the current path searching network creation unit 14 excludes the link between the nodes D and C (bidirectional) in the network shown in FIG. 12 to provide a network shown in FIG. 14, which is output from the current path searching network creation unit 14.

Figure 14:
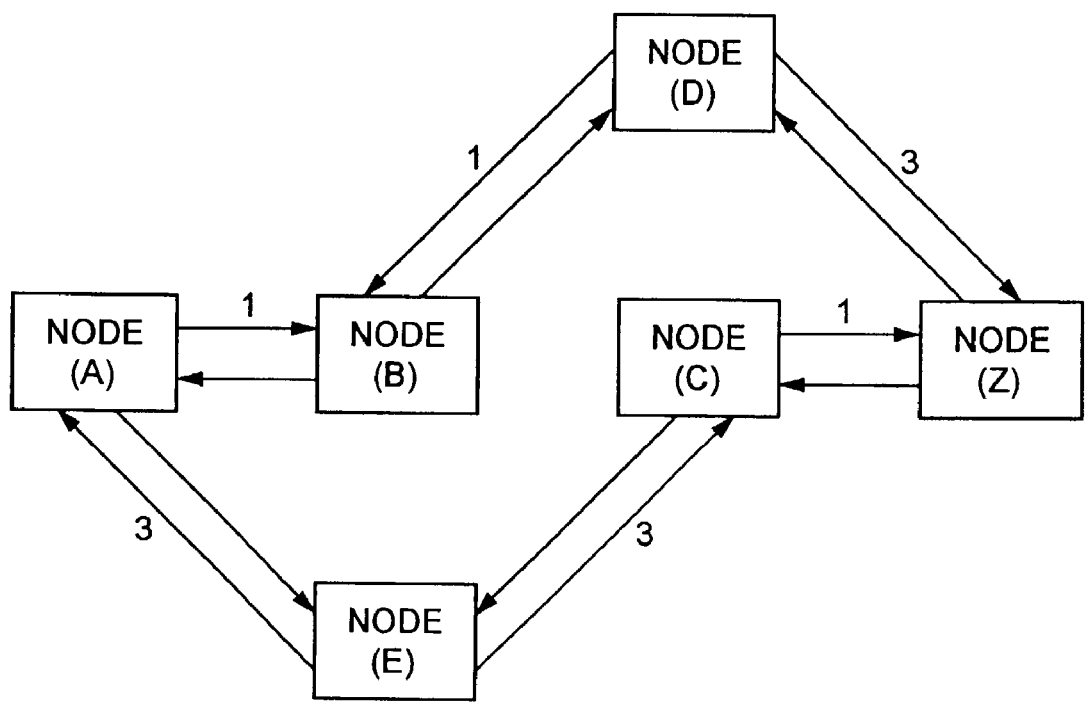
FIG. 14 is a diagram for illustrating the operation of designing a standby path according to the second embodiment of this invention.

The current path search unit 11 searches the network shown in FIG. 14 for a shortest route extending from the start point (node A) to the end point (node Z) for the third time (step S11 in FIG. 8). As a result, a current path (A-B-D-Z) is retrieved.

Then, the standby path searching network creation unit 12 creates a network for searching for a standby path from the network shown in FIG. 14 (step S12 in FIG. 8). In other words, the standby path searching network creation unit 12 excludes any link involved in the current path bidirectionally (step S12-1 in FIG. 8). Thus, a link between the nodes A and B (bidirectional), a link between the nodes B and D (bidirectional) and a link between the nodes D and Z (bidirectional), which are involved in the current path, are excluded in the network shown in FIG. 14.

Then, for each of the nodes, except for the start and end points, involved in the current path, the standby path searching network creation unit 12 excludes a link extending from the node only unidirectionally (step S12-2 in FIG. 8). This time, however, there is no link to be excluded (there is no link that extends from the node B or D). Thus, the network shown in FIG. 14 is transformed into a network shown in FIG. 15.

Figure 15:
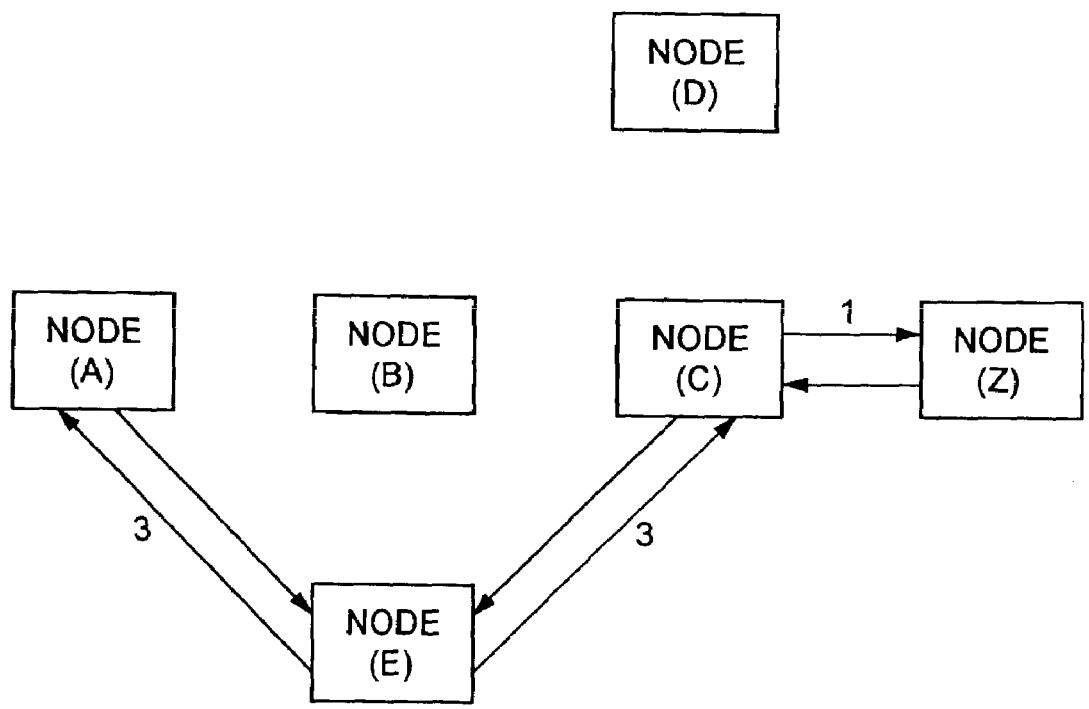
FIG. 15 is a diagram for illustrating the operation of designing a standby path according to the second embodiment of this invention.
Figure 16:
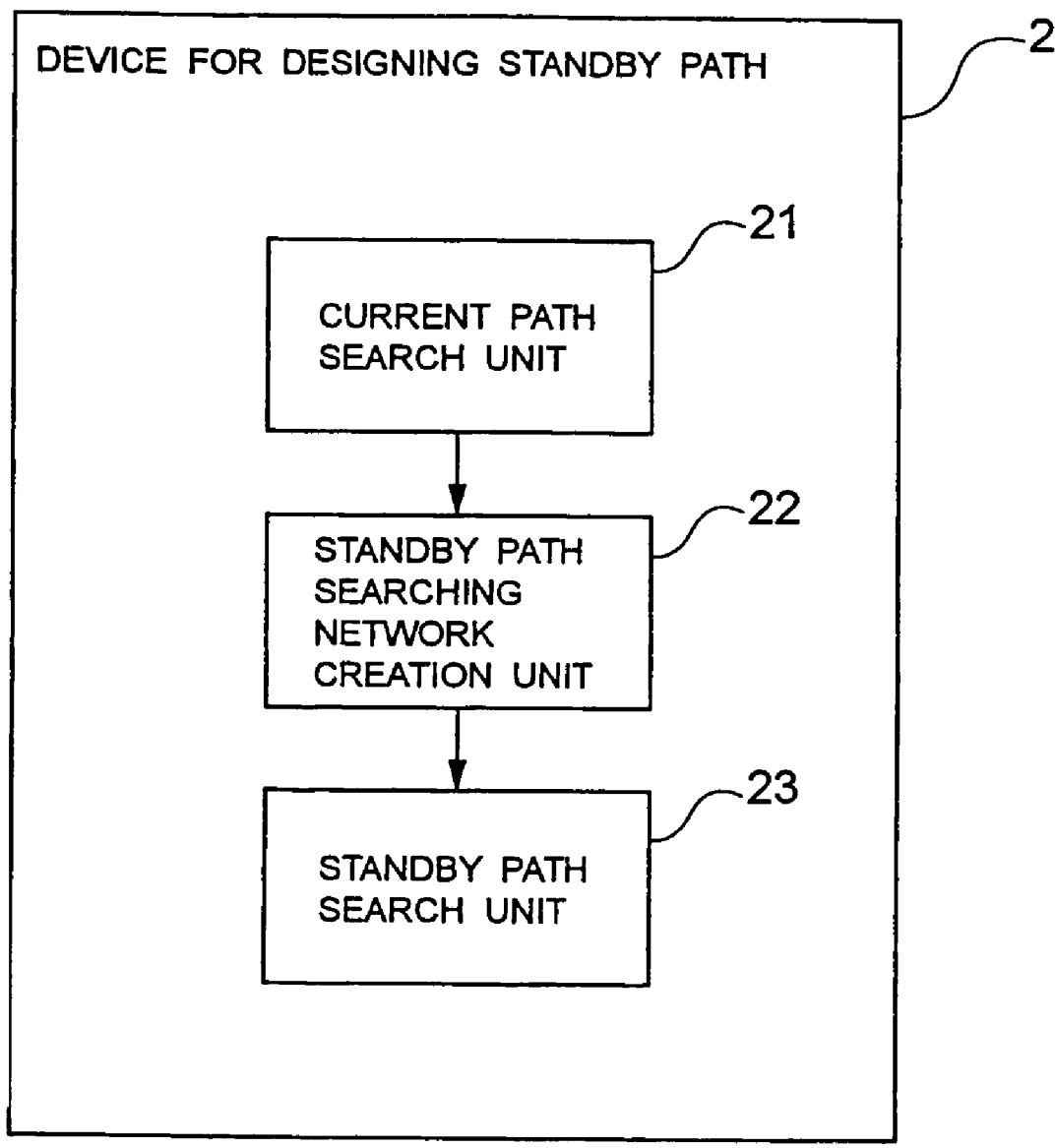
FIG. 16 is a block diagram showing a configuration of a conventional device for designing a standby path.

In the network shown in FIG. 15, the standby path search unit 13 searches for a shortest route from the start point (node A) to each of all other nodes including the end point (node Z) (step S13 in FIG. 8). As a result, the standby path search unit 13 reaches from the start point (node A) to the end point (node Z) (step S14 in FIG. 9), and the shortest path from the start point (node A) to the end point (node Z) is a path (A-E-C-Z). Thus, the current path (A-B-D-Z) and the standby path (A-E-C-Z) are set up (step S16 in FIG. 9), and retrieval of a standby path is completed. In this way, the standby path not involving any link and node involved in the current path can be designed.

As described above, according to this invention, a process is repeatedly performed which comprises searching a network for a current path, creating a standby path searching network based on the result of the search, searching for a standby path in the newly created network, and if no standby path is found, transforming the network. Therefore, retrieval of a standby path from a network including a standby path can be prevented from being failed.

What is claimed is:

1. A device for designing a standby path, comprising:
current path search means for searching a network for a current path;
standby path searching network creation means for creating a standby path searching network based on a result obtained by said current path search means;
standby path search means for searching for a standby path in the network created by said standby path searching network creation means; and
current path searching network creation means for transforming said network if said standby path search means has found no standby path,
wherein the result of the network transformation by said current path searching network creation means is passed to said current path search means, whereby the process performed by said current path search means, said standby path searching network creation means, said standby path search means and said current path searching network creation means is adapted to be repeated,
wherein said current path searching network creation means transforms said network by conducting a first processing of finding a node in the current path that is located farthest from a start point in nodes that said standby path search means has reached, and a processing of excluding bidirectionally a link between the node found in said first processing and the preceding node in the current path.

2. A device for designing a standby path, comprising:
current path search means for searching a network for a current path;
standby path searching network creation means for creating a standby path searching network based on a result obtained by said current path search means;
standby path search means for searching for a standby path in the network created by said standby path searching network creation means; and
current path searching network creation means for transforming said network if said standby path search means has found no standby path,
wherein the result of the network transformation by said current path searching network creation means is passed to said current path search means, whereby the process performed by said current path search means, said standby path searching network creation means, said standby path search means and said current path searching network creation means is adapted to be repeated,
wherein said standby path searching network creation means creates said standby path searching network by conducting a processing of excluding any link involved in the current path bidirectionally and a processing of excluding, for each of the nodes, except for the start and end points, involved in the current path, a link extending from the node only unidirectionally.

3. A method for designing a standby path, comprising:
a first step of searching a network for a current path;
a second step of creating a standby path searching network based on a result of the search;
a third step of searching for a standby path in the created network; and
a fourth step of transforming said network if no standby path is found,
wherein the search process from said first step to said fourth step is repeatedly performed, wherein in said fourth step, said network is transformed by conducting a first processing of finding a node in the current path that is located farthest from a start point among nodes reached in said third step and a processing of excluding bidirectionally a link between the node found in said first processing and the preceding node in the current path.

4. A method for designing a standby path, comprising:

a first step of searching a network for a current path;

a second step of creating a standby path searching network based on a result of the search;

a third step of searching for a standby path in the created network; and a fourth step of transforming said network if no standby path is found, wherein the search process from said first step to said fourth step is repeatedly performed, wherein in said second step, said standby path searching network is created by conducting a processing of excluding any link involved in the current path bidirectionally and a processing of excluding, for each of the nodes, except for the start and end points, involved in the current path, a link extending from the node only unidirectionally.

* * * * *